May 24, 1966     D. HOLLEY ETAL     3,253,069
METHOD OF CONSTRUCTING A MULTIPLE ARTICLE VACUUM FORMING DIE
Filed May 26, 1965
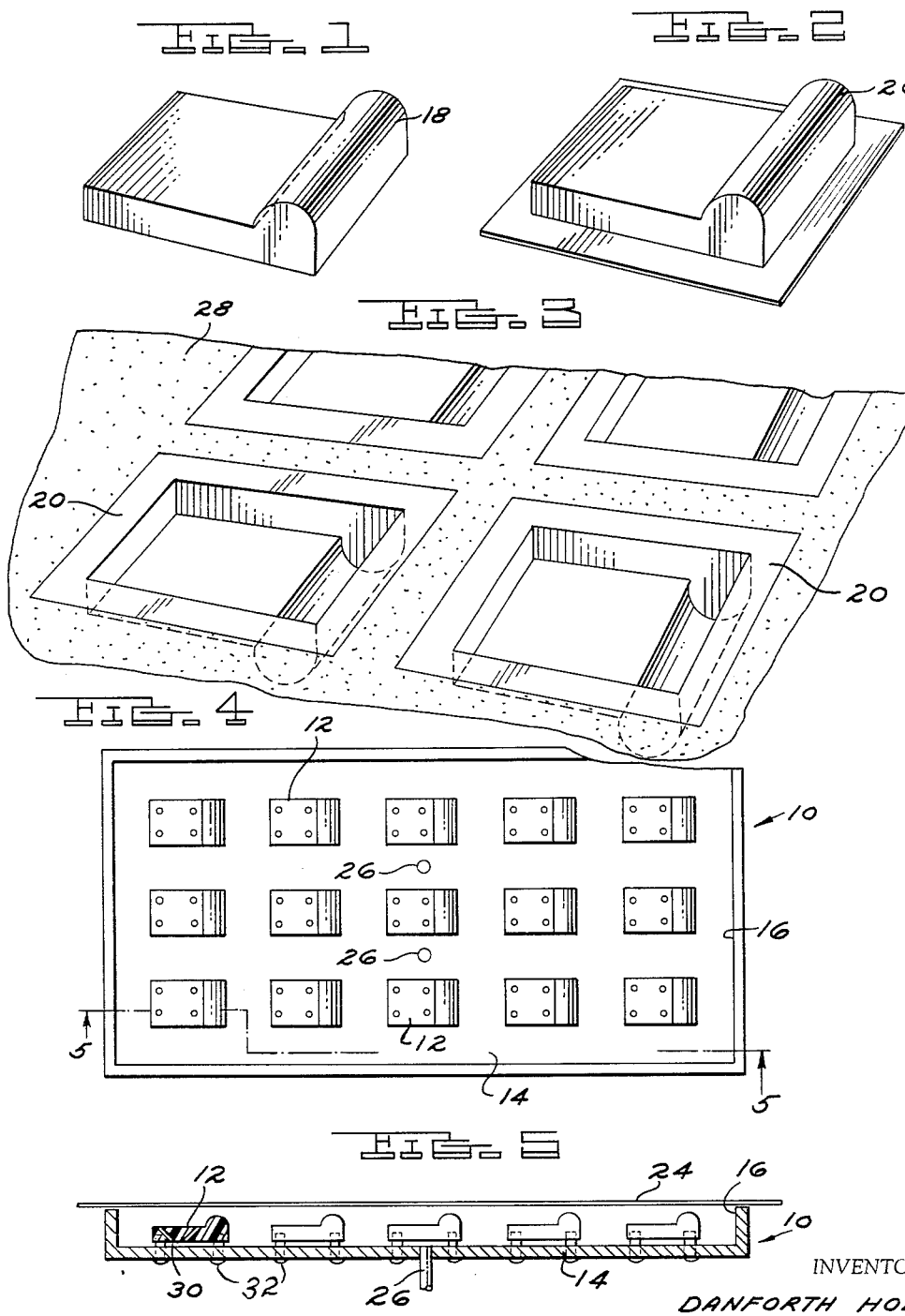
INVENTORS
DANFORTH HOLLEY
DUANE W. ROBERTSON
BY Whittemore, Hulbert
& Belknap ATTORNEYS United States Patent Office 3,253,069
Patented May 24, 1966

3,253,069
METHOD OF CONSTRUCTING A MULTIPLE ARTICLE VACUUM FORMING DIE
Danforth Holley, Grosse Pointe Farms, and Duane W. Robertson, Utica, Mich., assignors to Holley Plastics Company, Warren, Mich., a corporation of Michigan
Filed May 26, 1965, Ser. No. 463,463
4 Claims. (Cl. 264—90)

This application is a continuation-in-part of our application Serial No. 184,259, filed April 2, 1962.

The invention relates to dies and refers more specifically to a method of constructing a multiple article vacuum forming die.

In the past multiple article vacuum forming dies of the type wherein a plurality of article prototypes are secured to a die base forming a vacuum chamber which is secured to a vacuum source so that on placing of a sheet of film plastic over the die base and multiple article prototypes a vacuum may be drawn within the die base and the film sheet formed over the multiple article prototypes have been known.

The multiple article vacuum forming dies of the past have however been relatively expensive both in initial cost and in replacement of the article prototypes which deteriorate rather rapidly due to usage often under conditions of high moisture and heat. The expense of these dies is in a large measure due to the previous practice of producing separate article prototypes by individual machining of metal blocks or casting the material of which the article prototypes are constructed in plaster of Paris molds which necessitates polishing or machining of the surfaces of the individual prototypes to provide the smooth prototype surfaces required.

It is therefore one of the objects of the present invention to provide an improved method of constructing a multiple article vacuum forming die requiring the individual machining of only a single article prototype.

Another object is to provide a method of manufacturing a plurality of individual article prototypes comprising machining a first accurate prototype, vacuum forming a plurality of plastic shells over the master article prototype and casting in the individual shells a plurality of separate article prototypes.

Another object is to provide a method of constructing a multiple article vacuum forming die comprising producing a master article prototype, vacuum forming on the master article prototype a plurality of separate prototype shells, placing the shells in an inverted position in an easily formable material to provide support therefor, casting a plurality of separate article prototypes in the inverted shells, removing the prototypes from the shells and securing them to a vacuum die base in spaced relation to the base and to each other.

Another object is to provide a method of constructing a multiple article vacuum forming die as set forth above wherein the master article prototype and the individual shells formed thereon are rapidly cooled to reduce cooling shrinkage in the individual shells.

Another object is to provide a method of constructing a multiple article vacuum forming die as set forth above wherein the shells are removed from the separate article prototypes by tearing the shells away from the prototypes.

Another object is to provide a method of constructing a multiple article vacuum forming die as set forth above wherein the material of which the separate article prototypes are constructed is an epoxy resin having an aluminum filler therein.

Another object is to provide a method of constructing a multiple article vacuum forming die which is simple, economical and efficient.

Other objects and features of the invention will become apparent as the description proceeds, especially when taken in conjunction with the accompanying drawings, illustrating a preferred embodiment of the invention, wherein:

FIGURE 1 shows a representative master article prototype for use in producing a plurality of plastic shells in accordance with the method of constructing a multiple article vacuum forming die of the invention.

FIGURE 2 illustrates a plastic shell produced on the master article prototype illustrated in FIGURE 1 for use in producing a plurality of plastic article prototypes.

FIGURE 3 illustrates the step of producing a multiple article vacuum forming die in accordance with the invention in which a plurality of plastic shells as illustrated in FIGURE 2 are placed in a granular material in an inverted position to receive plastic cast therein.

FIGURE 4 is a plan view of a finished multiple article vacuum forming die constructed in accordance with the method of the invention.

FIGURE 5 is a longitudinal section of the multiple article vacuum forming die illustrated in FIGURE 4 taken substantially on the line 5—5 in FIGURE 4.

With particular reference to the figures of the drawing the method of constructing a multiple article vacuum forming die according to the invention will now be considered in detail.

In accordance with the invention the multiple article vacuum forming die 10 shown best in FIGURES 4 and 5 is constructed by securing a plurality of separate plastic article prototypes 12 to a die base 14 having the perpendicularly extending lips 16 around the periphery thereof. The separate article prototypes are supported in spaced relation to each other and to the die base 14.

The individual plastic article prototypes are produced by machining or otherwise manufacturing a master article prototype 18 as shown best in FIGURE 1, forming a plurality of plastic article prototype shells 20 as shown best in FIGURE 2 on the master article prototype 18, inverting the shells 20 and placing them in a bed of easily deformable material as shown best in FIGURE 3, and casting the individual plastic article prototypes in the shells 20.

In the usual manner of multiple article vacuum forming dies a vacuum is drawn in the die 10 between the base 14, lip 16 and a plastic sheet 24 placed thereover through the lines 26 adapted to be connected to a source of vacuum (not shown).

More specifically the master article prototype 18 shown best in FIGURE 1 may be produced by precision machining of aluminum, brass or other relatively permanent material or alternatively of course may be built up of welding or otherwise securing together standard geometric shapes. The master article prototype is therefore relatively expensive since the forming thereof in a hard material by machining or similar processes is relatively time consuming and requires precision work by skilled mechanics.

In the past each of the individual article prototypes in a multiple article vacuum forming die have been produced in an analogous manner whereby the cost of the finished vacuum forming die 10 has been relatively high.

In accordance with the present invention after the single master article prototype 18 has been produced by the usual methods a plurality of separate vinyl plastic article prototype shells 20 are vacuum formed over the single master prototype die. The plastic shells 20 as shown best in FIGURE 2 when inverted form a female mold having the surface contours of the master article prototype 18 the surfaces of which are extremely smooth due to the plastic material of which it is constructed. The specific vinyl plastic may be a polyvinyl chloride sheet.

In accordance with the invention shrinkage of the separate article prototype shells 20 during production thereof is reduced to a minimum. Thus immediately after the shell 20 has been formed on the prototype 18 by heat and vacuum the shell 20 and master prototype 18 are rapidly cooled with the shell still on the master prototype. The cooling may be accomplished by immersing the shell and master prototype in water if desired.

The plastic article prototype shells 20 are then placed in an inverted position in an easily formable material such as sand 28 as shown best in FIGURE 3. The sand 28 provides support for the relatively thin plastic vacuum formed article prototype shells 20 in the subsequent casting of plastic prototype shells 12 therein.

The plastic article prototypes 12 are then cast in the inverted article prototype shells 20 positioned in the sand 28. The plastic prototypes 12 may be cast of any settable plastic material which is suitable for the contemplated multiple article vacuum forming die 10.

For example, the plastic article prototype 12 may be cast of a thermosetting epoxy or phenolic resin. The epoxy should be an epoxy casting resin and may in fact be PX687A epoxy resin commercially obtainable from the Permalastics Corporation, Detroit, Michigan. A suitable phenolic is phenol-formaldehyde, commercially available from many sources. Further if desired the resin may have an aluminum filler included therein to reduce the shrinkage of the plastic article prototypes 12 on cooling thereof.

After the individual plastic article prototypes 12 have been cast in the shells 20 and cooled, the shells 20 and plastic article prototypes 12 are removed from the sand 28. The shells 20 are then removed from the plastic article prototypes 12 by tearing the shells away from the prototypes.

In contrast to article prototypes produced by previous methods wherein the plastic article prototypes are cast in a plaster of Paris mold, article prototypes produced in the shells 20 will have a smooth finished surface rather than a rough die surface which requires a separate polishing or machining operation.

To complete the multiple article vacuum forming die 10 in accordance with the invention it is only necessary to provide the die base 14 having the lip 16 extending around the periphery thereof substantially perpendicularly thereto and connected to a source of vacuum through the conduits 26. The individual plastic article prototypes 12 are then secured to the die base 14 in spaced relation to each other and to the die base 14 by convenient means such as screws 32 shown best in FIGURE 5 after the through vacuum openings 30 have been formed therein by the usual methods.

Thus it is seen that in accordance with the invention there is provided a method of constructing a multiple article vacuum forming die in which individual plastic article prototypes are produced in a simpler more economical and more efficient manner than previously whereby both the initial cost of the multiple article vacuum forming die and necessary replacement of individual plastic article prototypes is greatly reduced.

While one embodiment of the present invention has been set forth in detail, it is understood that other embodiments and modifications thereof are contemplated. Therefore it is the intention to include within the scope of the invention all such modifications and embodiments as are defined by the appended claims.

What we claim as our invention is:

1. The method of constructing a multiple article vacuum forming die comprising manufacturing a master article prototype, forming a plurality of prototype plastic shells over the master prototype of thin plastic sheet material, removing the prototype shells from the master article prototype, placing the prototype shells in an inverted position in a bed of granular material to provide support therefor, pouring a thermosetting resin in the inverted prototype shells, curing the resin in the shells to produce a plurality of plastic article prototypes, removing the plastic shells from the plurality of plastic article prototypes and securing the plastic article prototypes to a vacuum forming die base in spaced relation to each other.

2. The method as set forth in claim 1 and further including quenching the master article prototype and the prototype plastic shells with the prototype plastic shells on the master article prototype to rapidly cool the shells on the master article prototype to prevent shrinkage of the shells on cooling.

3. The method of constructing a multiple article vacuum forming die as set forth in claim 2 wherein the prototype plastic shells are vacuum formed over the master article prototype.

4. The method of constructing a multiple article vacuum forming die as set forth in claim 2 wherein the shells are removed from the plastic article prototypes by tearing.

References Cited by the Examiner

UNITED STATES PATENTS

| 2,363,213 | 11/1944 | Wallace | 18—47 |
|---|---|---|---|
| 3,014,614 | 12/1961 | Carroll et al. | 220—83 |
| 3,041,131 | 6/1962 | Juras et al. | 264—255 |
| 3,061,881 | 11/1962 | Sherno | 264—136 |

ROBERT F. WHITE, *Primary Examiner.*